United States Patent [19]

Pooch et al.

[11] 4,409,684
[45] Oct. 11, 1983

[54] CIRCUIT FOR SYNCHRONIZING A TRANSMITTING-RECEIVING STATION TO A DATA NETWORK OF A DIGITAL COMMUNICATION SYSTEM

[75] Inventors: Gerhard Pooch, Emmering; Hans-Juergen von der Neyen, Munich, both of Fed. Rep. of Germany

[73] Assignee: Siemens Aktiengesellschaft, Berlin & Munich, Fed. Rep. of Germany

[21] Appl. No.: 289,102

[22] Filed: Jul. 31, 1981

[30] Foreign Application Priority Data

Aug. 27, 1980 [DE] Fed. Rep. of Germany ....... 3032296

[51] Int. Cl.$^3$ ............................................. H04L 7/00
[52] U.S. Cl. ..................................... 375/116; 371/42
[58] Field of Search ................... 340/825.14; 370/106, 370/108; 375/96, 114, 116, 118; 371/42; 364/728

[56] References Cited

U.S. PATENT DOCUMENTS

| | | | |
|---|---|---|---|
| 3,576,947 | 5/1971 | Kruger | 375/116 |
| 3,699,261 | 10/1972 | Tomozawa | 375/116 |
| 4,232,197 | 11/1980 | Acampora et al. | 370/104 |
| 4,312,070 | 1/1982 | Coombes | 371/42 |

*Primary Examiner*—Benedict V. Safourek
*Attorney, Agent, or Firm*—Hill, Van Santen, Steadman & Simpson

[57] ABSTRACT

A circuit is provided for synchronizing a transmitting-/receiving station to the data network of a digital communications system having a correlation receiver in the relevant receiving device which supplies a correlation signal serving for synchronization purposes. The function of the correlation receiver is to implement the bit synchronization and block synchronization for the most favorable radio range from an asynchronous state, in the synchronous state to supply the adjustment criteria for the current radio range and, in the event of rebooking, to supply those of all the other possible radio ranges (indirect access to the adjusting elements via a computer). For this purpose, in the receiving device, the incoming non-generated items of received data are fed, on the one hand, to the correlation receiver and, on the other hand, to a regenerating device which can be set up by the signals of the correlation receiver. The correlation receiver comprises a signal output for the received pulse train setting-up (bit synchronization) and a signal output for block synchronization. The two signal outputs are connected to a computer. In addition, the signal output for the bit synchronization is connected to the regenerating device via a computer-control switch and via a phase pulse train shift device, whereas the signal output for block synchronization is connected thereto via a switch which is also controlled by the computer.

3 Claims, 4 Drawing Figures

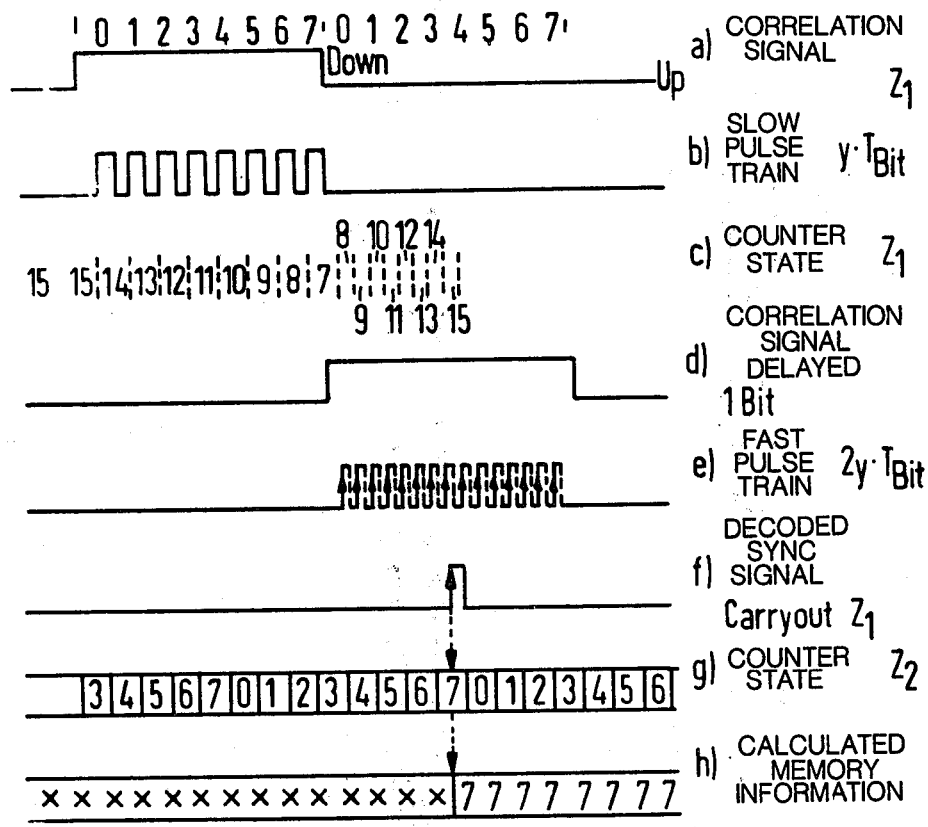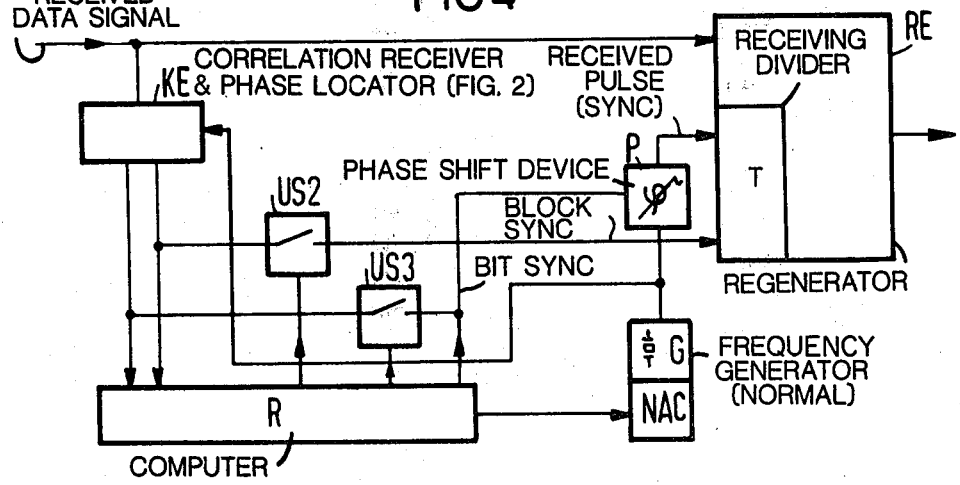

CIRCUIT FOR SYNCHRONIZING A TRANSMITTING-RECEIVING STATION TO A DATA NETWORK OF A DIGITAL COMMUNICATION SYSTEM

BACKGROUND OF THE INVENTION

1. Field of the Invention

The present invention relates to a circuit for synchronizing a transmitting-receiving station to a data network of a digital communications system, comprising a correlation receiver in the receiving device comprising a transit time chain in which the input digital signal, a data block containing code words inserted at determinate points of the block (Barker code), is delayed, and further comprising of a number, corresponding to the number of signals, of parallel outputs of the transit time chain, each of which is connected to an inverter which can be set up in accordance with the Barker code and whose outputs are connected to a majority decision device which supplies a correlation signal which serves for synchronization purposes.

2. Description of the Prior Art

Digital communications systems transmit data flows between transmitting and receiving stations. In a data network, a whole series of receiving stations are connected to a single transmitting station. The connection can be established via a permanent wire line or by a radio channel. If further receiving stations are to be connected, before they are able to actively participate in the data exchange, they must be synchronized from an asynchronous state to the data network.

Depending upon the nature of the data transfer, various types of synchronization are needed for the synchronization process. Therefore, the receiving pulse train which follows the input signal is required for error-free recognition and processing of the received data. In dependence upon the characteristics of the transmission link, the received signal not only suffers weakening of level, but also transmit distortions or interference disturbances as a result of multi-channel propagation. The bit synchronization which is required in this case is achieved if the interrogation edge of the receiving pulse train comes to lie on the analog received signal at a time of approximately maximum read-out security.

If a data transmission is effected in a block-structured form, when the transmitting-receiving station is brought into synchronization, block synchronization is required in addition to bit synchronization.

For the determination of the block and phase relationship, special code words are transmitted at determinate positions in the block (Barker code) and are analyzed at the receiving end by auto-correlation techniques.

In synchronous networks, a fixed block relationship prevails between all of the transmitting/receiving stations to an approximate extent, i.e. except for radio transit time differences within a radio range. Bit synchronism is necessary for the stations directly participating with one another in the data exchange. Furthermore, the stations can operate with multiple access in which case the block-wise data exchange is always linked to fixed time locations. Therefore, each transmitted data block contains a code word of sufficient length (Barker code) which in the receiving device supplies the requisite block and phase corrections via correlation.

In the case of a mobile radio network as already described in earlier applications of the assignee, a correlation receiver of this type having an extended range of functions is to be used. This mobile radio network represents a synchronous network in which the data traffic and speech traffic between the mobile radio subscriber stations and the stationary, fixed stations is handled with fixed ratio range assignment. Before a conversation is established, organizational data exchange between a mobile subscriber and a fixed station is necessary, such as for example application, rebooking or transfer of dialed number. A separate radio channel (organization channel) is provided for handling purposes in which a plurality of fixed stations can operate with multiple access, therefore with fixed time location assignment. This assignment provides a mobile subscriber with the possibility of entering into an organizational data link with the radio range most favorable for the same via the reception quality control. However, following this establishment in all time slots (radio ranges) the reception quality and the setting-up criteria continued to be measured in order that, in the event of a change in the radio field parameters resulting from a change of location of the mobile subscriber, the new optimum radio range may be immediately recognized and the requisite setting-up information may be ready. If the system properties are fulfilled in this manner, a rebooking process can be fulfilled without problems. The function of the correlation receiver is, on the one hand, to implement the bit and block synchronization for the favorable radio range from an asynchronous state (direct access to the setting-up elements), and, on the other hand, in the event of synchronous operation, to supply the setting-up criteria for the current radio range and, in the event of rebooking, to supply those of all the other possible radio ranges (indirect access to the setting-up elements via a computer).

SUMMARY OF THE INVENTION

The object of the present invention is, therefore, for such synchronization of the transmitting/receiving station to the data network of a digital communications system, to provide a circuit which, by means of a correlation receiver and an assigned computer, can fulfill the above-described requirements in a simple manner.

The above object is realized, according to the present invention, in that in the receiving device the incoming non-regenerated items of received data are, on the one hand, fed to a correlation receiver which possesses one signal output for the setting-up of the received pulse trains (bit synchronization) and a signal output for the block synchronization, and, on the other hand, are fed to a regenerating device which can be set up by the signals from the correlation receiver. In addition, the two signal outputs of the correlation receiver are connected to a computer and, in addition, the signal output for the bit synchronization is connected via a switch controlled by the computer and via a phase pulse train shift device, whereas the signal output for the block synchronization is connected via the switch controlled by the computer, in each case to the regenerating device.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 3 is a timing diagram of the phase locating process; and

FIG. 4 is a schematic block diagram illustration of the receiving component of the transmitting/receiving station having a correlation receiver and synchronizing devices.

DESCRIPTION OF THE PREFERRED EMBODIMENTS

Figure 1:
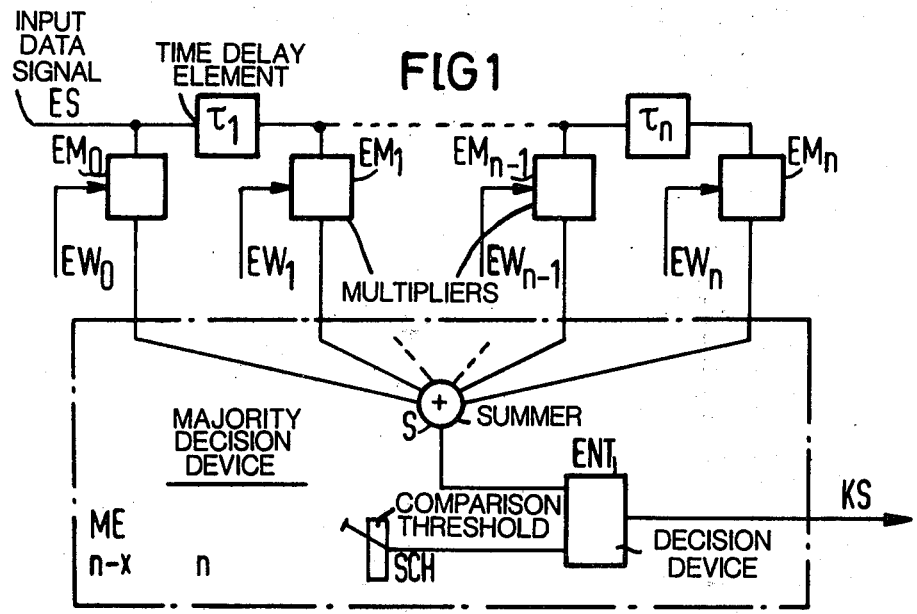
FIG. 1 is a schematic block diagram of a correlation receiver.

In a correlation receiver, as illustrated in FIG. 1, the input data signal ES is fed to a time delay chain whose time delay elements exhibit a delay time of $\tau_1 \ldots \tau_n$. The time delay of each time delay element corresponds precisely to the duration of one data signal. The number of parallel outputs in which adjustable multipliers $EM_O$—$EM_n$ (where n is the word length of the Barker code) are connected corresponds to the number of signals of the Barker code. Here, the adjustable multipliers EM are set up by the expected code $EW_O$—$EW_n$ in such a manner that when the Barker code word is applied in parallel to the output constituted by a summation point S, at which the branches containing the multipliers EM are combined, a maximum occurs. This maximum remains for the duration of the last Barker code signal. At its output, a majority decision device ME, framed in broken lines on the drawing, supplies a correlation signal KS if the maximum permissible recognition error x has not been overshot. Therefore, x is the number of signals with the evaluation of which during correlation an output signal can nevertheless be detected. This value can be set up via a comparison threshold SCH of a decision device ENT whose second input is connected to the summation point S, hereinafter referred to as a "summer". On the appearance of the correlation signal, all the pulse trains and signals which are time-critical in respect of the block and phase relationship are synchronized. Prior to being emitted, the correlation receiver output signal is converted in such a manner that it marks the optimum read-out phase. This signal is additionally coded for transfer to a computer.

Figure 2:
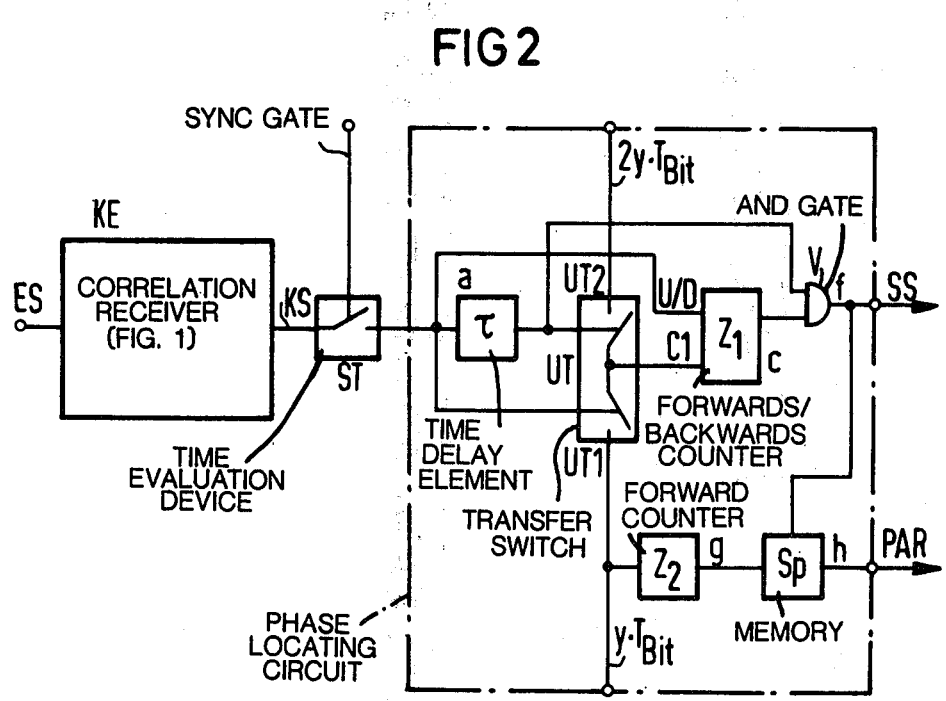
FIG. 2 is a schematic block diagram of a correlation receiver followed by a device for phase locating.

FIG. 2 is a block circuit diagram of a phase locating circuit which effects the phase coding from the already-digitalized correlation signal KS. This can fundamentally be effected in two modes, in particular by direct statement of phase (direct setting-up) with the synchronization signal SS at the output or by setting-up determined, over several results, using a computer as a phase address PAR.

The correlation signal KS is fed by way of a time evaluation device to a phase locating circuit, illustrated in broken lines. The phase locating process is basically independent of the signal duration shift of the two logic states of the received data flow ES (change in current flow angle). A time evaluation of the synchronization signal is effected by a synchronization gate. The time evaluation device comprises a switch SE which is closed only at the expected time of a correlation signal. The effects of simulated signals can be virtually suppressed by establishing the likely time of the correlation signal KS by way of the switch ST. The correlation signal KS is emitted from the output of the switch ST, as in the case of FIG. 1 already described above.

The optimum read-out phase is determined in the analysis circuit which is referred to as a phase locating circuit. The analysis circuit which supplies the correct setting-up information for the received pulse train correction at the interrogation of time of the next useful bit which follows the Barker code word, will be described below. In addition, the phase locating function will be explained with reference to the timing diagram of FIG. 3.

The circuit illustrated in FIG. 2 which serves for phase locating the received pulse train to which the correlation signal KS of the correlation receiver KE is fed comprises a line branching arrangement at its input. A first line branch leads to the setting-up direction input (U/D) of a forward/backwards counter Z1 whose counting input C1 is connected to a transfer switch UT. A second line branch contains a delay element having a delay time $\tau$ of 1 bit whose output signal, on the one hand, controls one make-and-break contact UT2 of the transfer switch UT and, on the other hand, is connected to one input of a logic linking element V, here and AND gate, whose second input is connected to the output of the counter Z1. A third line branch controls the second make-and-break contact UT1 of the transfer switch UT. By way of the make-and-break contacts UT1 and UT2 which are controlled by the correlation signal or the delay correlation signal, a fixed supply pulse train $y \cdot T_{Bit}$ which corresponds to the setting-up element size of the received pulse train, on the one hand, and a high pulse train $2y \cdot T_{Bit}$, on the other hand, are fed to the counting input C1 of the counter Z1.

Also provided is a forward counter Z2 which operates with the fixed pulse train $y \cdot T_{Bit}$ in modulo-y operation. This forward counter Z2 is followed by a memory Sp which is simultaneously connected to the output of the logic-linking element V and whose output PAR (phase address) is connected to the computer for further processing therein.

In the phase locating circuit, lower case letters have been entered which form with the corresponding letters in the timing diagram of FIG. 3 and represent specific signal curves and counting pulse trains or counts. Therefore, the description of the operation of this circuit will refer to the corresponding letters in the timing diagram. Here, it has been assumed that $y=8$.

The correlation signal a, on the one hand, controls the counting direction of the forwards/backwards counter Z1 and, on the other hand, connects the slow pulse train $y \cdot T_{Bit}$ via the transfer switch UT to the pulse train input C1—the counting input—of the counter Z1. From the determinate starting position, the count of the counter Z1 is set in accordance with its counting direction. The counting direction changes with the negative-going edge of the correlation signal KS. At the same time, the counter Z1 remains stationary until, via the delay element $\tau$, the delayed correlation signal (d) switches through the high pulse train $2y \cdot T_{Bit}$ via the transfer switch UT to the pulse train input (counting input) C1 of the counter Z1. Similarly, the count (c) of the counter Z1 now changes with a reversed sign and at twice the speed. The counter starting position is reached exactly in the middle of the delayed correlation signal and is logically-linked thereto. The decoded output signal, that is the synchronization signal, (f) first of all defines a specific block position (bit synchronization) and, on the other hand, with its positive-going edge, defines the optimum received pulse train phase (bit synchronization). By means of the block synchronization, the transmitting and receiving dividers in the transmitting/receiving station are brought into the bit pulse train level. As the setting-up information of the received pulse train phase is further processed in a computer, this is transferred as a relative address PAR. This is effected by the forward counter Z2 which operates with a fixed pulse train $y \cdot T_{Bit}$ in modulo-y operation. With the transfer edge of the synchronization signal SS, the instantaneous count of the counter Z1 is transferred into the intermediate memory SP. This information is retained until the analysis of the following synchronization signal and, when required, is output from the computer.

If the time relationship of the counter Z2 in stationary devices (radio concentrators) of a synchronous data network is defined network-wise, by means of the difference count between the device's own reference value and the instantaneous count corresponding to the time of the synchronization signal SS received from a mobile subscriber, it is possible to directly determine the range of the mobile subscriber from the stationary station via the known pulse train $y \cdot T_{Bit}$. Here, it is assumed that in the mobile subscriber stations a permanently set known phase relationship exists between the signaling received by the stationary station and the stationary station's own transmitting signal.

FIG. 4 illustrates the receiving component for the base band of the transmitting/receiving station. Here, the incoming useful signal is fed, on the one hand, to the correlation receiver KE and, on the other hand, to a controlled regenerator RE in which it is regenerated with the pulse train of an internal pulse train loop.

The correlation receiver KE comprises a signal output for the received pulse train setting up (bit synchronization) and a signal output for the block synchronization, both of which are connected to a control component (computer) R, for example a microprocessor. The signal output for the bit synchronization is also connected by way of a switch US3, controlled by the computer, to a received pulse train phase shift device P for direct setting-up of the received pulse train phase which is connected to the regenerator. The signal output for the block synchronization is directly connected to the regenerator RE via a switch US2 controlled by the computer R. Also obtained from the computer R is a follow-up value for the normal frequency generator G which is connected to the correlation receiver KE and the received pulse train phase shift device P. On the recognition of the correlation signal, the exact values for the bit synchronization and the block synchronization are set up in the received pulse train phase shift device P in the case of the bit pulse train and in a receiving divider T arranged in the regenerator RE in the case of the block pulse train via the switches US3 and US2 respectively. In this manner, the transmitting/receiving device is synchronized to the data network. In synchronous operation, the correlation receiver KE, in conjunction with the computer R, undertakes the synchronization control of the transmitting/receiving device. Here, the synchronization control consists of the received pulse train phase regulation and the check on the block synchronism. The received pulse train phase regulation is effected by averaging the output signals of the correlation receiver KE in the computer R and adjusting the phase pulse train shift device P by the computer output. The check on the block synchronization is effected by monitoring the correlation signal at the expected time, predetermined by a divider chain (Sync gate).

To summarize, the individual functions fulfilled in an advantageous manner by the above-described circuit are as follows.

In the event of aperiodic operation, first of all the transmitting/receiving device is synchronized to the network. This is because it is not possible to determine the likely time of the correlation signal from asynchronous operation. All of the signals which have been recognized in the correlation receiver are investigated in the computer in respect of their block spacing. Here, a comparison of the similarity of spacings indicates the approximate block relationship (radio transmit time influence) and the parallel operating reception quality determination indicates the radio range most suitable for establishing a connection. The release for synchronization always takes place in the time slot of the particular selected radio range until a recognized correlation signal becomes operative. For this, deliberate access to the correlation receiver supplies the following criteria:

direct setting-up of the received pulse train for the following data analysis; and setting of the system pulse trains, i.e. reference for the data coding.

In the synchronized state, for further processing by the computer, the correlation receiver indirectly supplies the received pulse train setting-up device which is averaged in the computer, and the frequency correction for the normal frequency generator by averaging the received pulse train setting-up information.

Therefore, the circuit of the present invention advantageously facilitates an aperiodic operating mode in which direct and indirect access, i.e. via the computer, to the setting-up elements for the block synchronization and the bit synchronization is possible. The adjustment speed of the control value received pulse train phase and normal frequency can be individually set via the computer, the upper limit being governed by the speed of the measured-value detection. The received pulse train phase is determined in the digital phase locating device, which is largely independent of the current flow angle change and can be used for reading out the next signal which follows the Barker code word. Through the similarity comparison of the analyzed correlation signals, a mobile station can recognize the block relationship to the accuracy of the radio transit time difference fluctuation, which is governed by the different distance from the individual stations.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a circuit for synchronizing a transmitting/receiving station to the data network of a digital communication system which comprises a correlation receiver in the receiving device, the correlation receiver including a multi-stage time delay chain in which the input data signals, composed of a data block containing code words inserted at determinate points of the data block as a Barker code, is delayed, the time delay chain including a plurality of parallel outputs each connected to an input of a respective multiplier, which multipliers can be set to the Barker code, and in which the multipliers have respective outputs which are connected to a majority decision circuit which is operable to provide a correlation signal for synchronization purposes, the improvement therein comprising:

- synchronization means in said correlation receiver including a bit synchronization output and a block synchronization output for providing respective bit and block synchronization signals;
- a regenerator including a plurality of inputs one of which is connected to receive the input data signal and including an output;
- a phase shifter including an input for connection to said bit synchronization output, a control input, and an output connected to another one of said inputs of said regenerator for controlling the phase of the bit synchronization signals;
- a first switch connected between said bit synchronization output and said input of said phase shifter;
- a second switch connected between said block synchronization output and a further one of said inputs of said regenerator;
- said first and second switches each including a control input; and
- control means connected to said bit and block synchronization outputs and connected to said control inputs of said first and second switches and to said control input of said phase shifter, and operable to correct phase shift and connect said output synchronization outputs to said regenerator for synchronized operation of said regenerator.

2. The improved circuit of claim 1, wherein, for a multi-range radio system, said control means comprises:
- a computer which is operable to constantly average the measured values of the received pulse train for each radio range so that said phase shifter may be controlled for a respective radio range when it is necessary to access that radio range.

3. The improved circuit of claim 2, and further comprising a phase locating device connected to said correlation receiver, said phase locating device comprising:
- clock means producing a first clock at a first frequency and a second clock at a second frequency which is twice the first frequency;
- a forwards/backwards counter having a predetermined starting count and counting direction, and including
- a counting input and switch means connected to said correlation receiver and to said clock means to receive the first clock for the forward counting direction and the second clock for backwards counting, and operable in response to the signal change edge of a correlation signal to selectively connect the first and second clocks to said counting input;
- delay means connected between said correlation receiver and said switch means for delaying the change of counting direction and temporarily holding the count;
- a forward counter connected to receive and be operated by the first clock;
- gate means connected to said forwards/backwards counter and to said delay means for gating out the stored count; and
- memory means connected to said computer and to said gate means for receiving the gated out counts, and connected to and operated to store the count of said forward counter in response to a gated out count representing the starting count of said forwards/backwards count.

* * * * *